United States Patent

[11] 3,593,620

[72] Inventors Dave John Foerster
 Scotts;
 James S. Mason, Marcellus, both of, Mich.
[21] Appl. No. 851,602
[22] Filed Aug. 20, 1969
[45] Patented July 20, 1971
[73] Assignee Pneumo Dynamics Corporation
 Cleveland, Ohio

[54] REDUNDANT CONTROL SYSTEM FOR ACTUATION OF FLIGHT CONTROL SURFACES
 16 Claims, 3 Drawing Figs.

[52] U.S. Cl. .................................................... 91/413,
 91/411 B, 92/140, 92/146
[51] Int. Cl. ...................................................... F15b 13/06
[50] Field of Search ........................................... 91/413,
 411, 411 A; 92/146, 110, 111, 76, 140; 244/77 M;
 60/97 H, 52 VS

[56] References Cited
 UNITED STATES PATENTS
 3,272,090 9/1966 Ellis.............................. 92/140

Primary Examiner—Edgar W. Geoghegan
Attorney—Stephen M. Mihaly

ABSTRACT: A redundant control system including a two-part housing, each part containing one or more output pistons extending into associated cylinders in the other part and two or more separate fluid circuits for actuating different pistons thus to physically isolate one system from another so that should a failure occur in one system it will not affect the other system. The porting to one or more of the cylinders is through the pistons associated therewith.

INVENTORS
DAVE J. FOERSTER
JAMES S. MASON

BY Stephen M. Mihaly

ATTORNEY

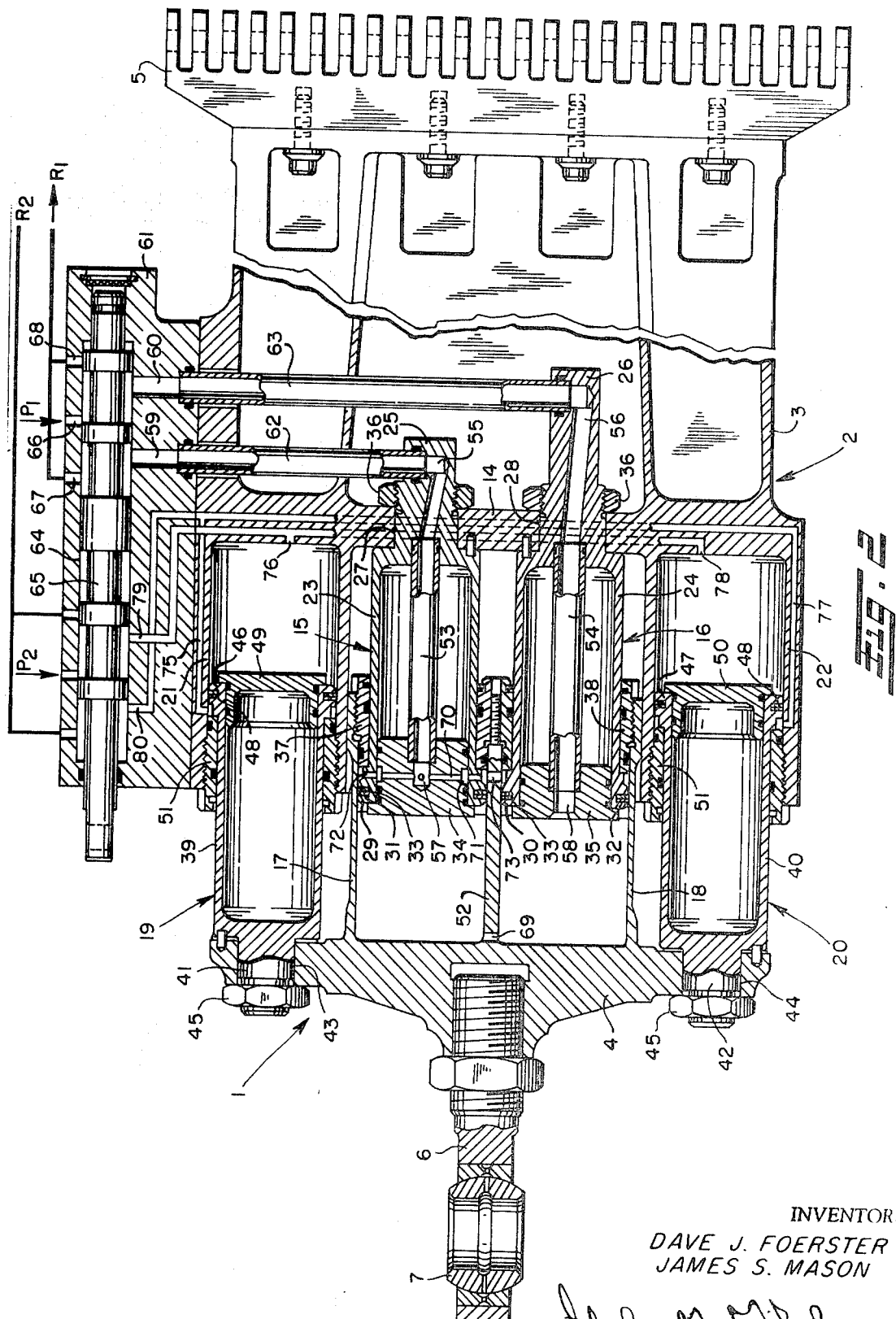

REDUNDANT CONTROL SYSTEM FOR ACTUATION OF FLIGHT CONTROL SURFACES

BACKGROUND OF THE INVENTION

The present invention relates generally as indicated to a redundant control system for actuation of flight control surfaces and more particularly to a simplified control system of single unit construction which is relatively compact and lightweight, and failures in one system do not affect the operation of the other system.

For actuation of the ailerons and other flight control surfaces of aircraft, it is often desirable if not essential to provide a redundant control system including two or more cylinders operated by separate fluid circuits so that in the event of a failure of one of the fluid circuits, movements of the flight control surfaces can still be controlled by the other fluid circuit. However, as the number of cylinders and fluid circuits for a particular control system is increased, not only does the complexity and cost of the system increase, but also the space and weight requirements, which are important considerations in the design of aircraft control systems. The more compact and lightweight the design for a particular application, the better, provided of course it is as reliable as comparable designs, and is not too costly. Moreover, should a crack or rupture occur in one system resulting in a failure in that system, it should not in any way affect the operability of the other system.

SUMMARY OF THE INVENTION

With the foregoing in mind, it is a principal object of this invention to provide a redundant control system which is very compact and yet complete physical separation of the two hydraulic systems is maintained so that if a crack, rupture or other mechanical failure should occur in one system resulting in loss of that system it will not propagate and affect the other system.

It is another object of this invention to provide a redundant control system in which all of the fluid cylinders are contained in a single unit to provide a lightweight, compact construction.

Another object is to provide such a redundant control system which is of relatively simple and inexpensive construction.

Another object is to provide such a control system with a novel porting arrangement for supplying fluid pressure to the cylinders therefor.

These and other objects of the present invention are achieved by providing a two-part housing for the control system, each part containing one or more output pistons extending into cylinders in the other part and operated by two or more separate fluid circuits thus to physically isolate one system from the other so that should a rupture or other failure occur in one system it will not affect the other system. Porting to the cylinders in one of the housing parts is accomplished through the pistons associated therewith. Where there are two such cylinders located side by side in such one housing part, one of the associated pistons carries fluid to the head side of that piston and the head side of the adjacent piston receives fluid through a first porting hole in the cylinder wall. The adjacent piston carries fluid to the rod side of that piston, and the rod side of the first-mentioned piston receives fluid through a second porting hole in the cylinder wall.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF THE DRAWINGS

In the annexed drawings:

FIG. 2 is an enlarged fragmentary longitudinal section through the control system of FIG. 1, taken on the plane of the line 2-2 thereof.

DESCRIPTION OF THE PREFERRED EMBODIMENTS

Figure 1:
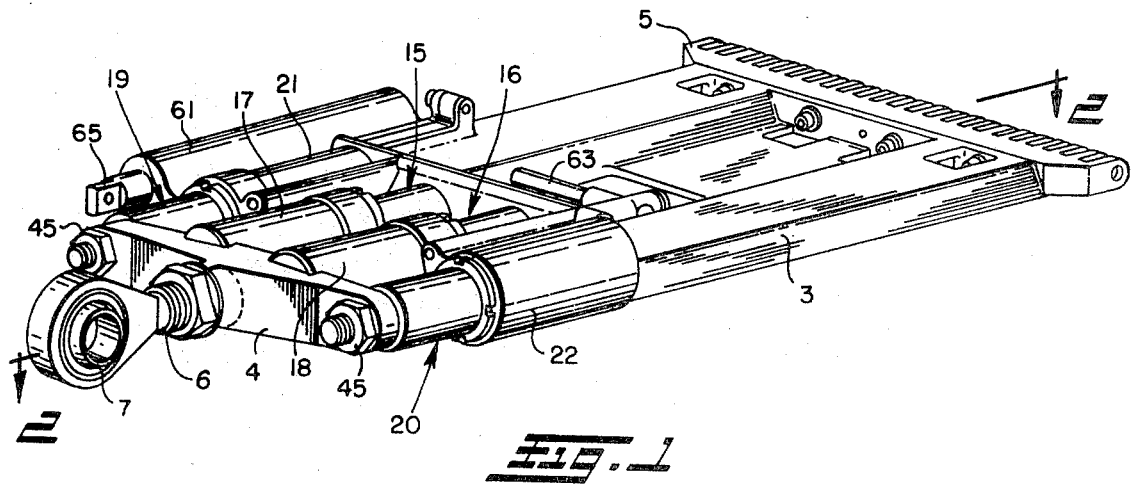
FIG. 1 is an isometric view of a preferred form of redundant control system in accordance with the present invention.

Referring now in detail to the drawings and first especially to FIGS. 1 and 2, a redundant fluid contact system or actuator in accordance with this invention is generally indicated by the reference numeral 1 and contained in a single housing 2 to provide a compact, single-unit construction. As shown, the housing is formed in two parts 3 and 4. The part 3, which is referred to as the aft housing part, has a piano-type hinge 5 bolted or otherwise secured to one end for connection to the aileron or other movable control surface of an aircraft, and the other part 4, which is known as the rod end housing part, has a rod 6 projecting therefrom for connection to the aircraft structure by a spherical bearing 7.

The aft housing part 3 has a transverse web portion 14 to which is bolted a pair of axially extending inboard pistons 15 and 16 received in a pair of axially aligned cylinders 17 and 18 projecting from the rod end housing part 4 toward the pistons 15 and 16. Similarly, there are a pair of axially extending outboard pistons 19 and 20 bolted to the rod end housing part 4 which extend into axially aligned cylinders 21 and 22 in the aft housing part 3 outwardly of the inboard pistons 15 and 16 and associated cylinders 17 and 18. The inboard pistons 15 and 16 comprise hollow rod portions 23, 24 having studs 25, 26 on their inner ends which projects through openings 27, 28 in the transverse web portion 14, and enlarged head portions 29, 30 on the opposite ends provided with peripheral grooves 31, 32 containing packings 33 for establishing sealed engagement with the inner surfaces of the respective cylinders 17 and 18. Covers 34, 35 inserted into the head ends of the inboard pistons 15, 16 seal off the interior of the hollow rod portions, and jam nuts 36 threaded onto the outer ends of the studs 25, 26 clamp the inboard pistons to the web portion 14. Sealing gland assemblies 37, 38 threaded into the outer ends of the inboard cylinders 17, 18 establish sealed engagement with the outer surfaces of the rod portions 23, 24 to prevent fluid leakage therebetween.

The outboard pistons 19 and 20 are of a similar construction, including hollow rod portions 39, 40 having studs 41, 42 projecting from their closed ends through openings 43, 44 in the housing part 4 for locking the outboard pistons in place by jam nuts 45 threaded onto the studs, and head portions 46, 47 on the opposite ends of the rod portions provided with peripheral grooves containing packings 48 for establishing a fluidtight seal with the inner surfaces of the associated cylinders 21 and 22. Covers 49, 50 close the open ends of the hollow rod portions 39, 40, and packing gland assemblies 51 are threaded into the outer ends of the cylinders 21 and 22 for establishing sealed engagement with the adjacent surfaces of the outboard rod portions 39, 40.

As shown in FIGS. 1 and 2, the inboard cylinders 17 and 18 for the inboard pistons 15 and 16 are disposed side-by-side and have a common wall portion 52 therebetween which not only reduces the overall weight of the system, but also permits the use of a relatively simple fluid porting arrangement between the inboard cylinders as explained hereafter. The rod portions 23, 24 of the inboard pistons 15, 16 contain porting tubes 53, 54 which communicate fluid passages 55, 56 in the stud portions 25, 26 with additional fluid passages 57, 58 in the associated piston covers 34, 35, and the fluid passages 55, 56 in the stud portions are in turn connected to fluid ports 59, 60 in a valve manifold 61 through suitable floating tubes 62, 63 running between the two. The valve manifold 61 may be suitably connected to the aft housing part 3 and contains a bore 64 in which is disposed a valve spool 65 having lands thereon which upon axial movement of the valve spool in opposite directions supplies fluid pressure entering the supply port 66 from a source $P_1$ to one of the fluid ports 59, 60 and connects the other fluid port to a reservoir $R_1$ through the respective return ports 67, 68 and vice versa, in a manner well known in the art.

The fluid passage 58 in the piston cover 35 communicates directly with the head end of the associated inboard cylinder 18, and the head end of the adjacent inboard cylinder 17 receives fluid through a porting hole 69 in the common cylinder wall portion 52. The fluid passage 57 in the cover 34 of the other inboard piston 15 communicates with the rod end of the inboard cylinder 17 through radial passages 70 and annular groove 71 in the associated cover and radial passages 72 in the rod portion 23 of that piston for supplying fluid to the rod end of the inboard cylinder 17 which is in turn carried to the rod end of the other inboard cylinder 18 through another porting hole 73 in the common cylinder wall portion 52. In this manner, one of the inboard pistons 16 ports only to the head or extend end of the inboard cylinders 17, 18 and the other inboard piston 15 ports only to the rod or retract end of such cylinders and not both.

Porting to opposite ends of the outboard cylinders 21, 22 may be achieved by providing separate flow passages 75, 76 and 77, 78 in the aft housing part 3 which communicate with opposite ends of the outboard cylinders 21, 22. Such fluid passages 75, 76 and 77, 78 may communicate with additional fluid ports 79, 80 in the valve manifold 61 for connection to a second source of pressure $P_2$ and reservoir $R_2$ by actuation of the same valve spool 65, or a separate valve may be provided for that purpose. In any event, it is preferred that the fluid circuit for actuating the outboard pistons 19, 20 be separate from the fluid circuit for the inboard pistons 19, 20 be separate from the fluid circuit for the inboard pistons 15, 16, whereby in the event of failure of one fluid circuit, the flight control surface can still be controlled by the other fluid circuit, but at reduced power. Actuation of the valve spool may either be manual or automatic, as desired.

Figure 3:
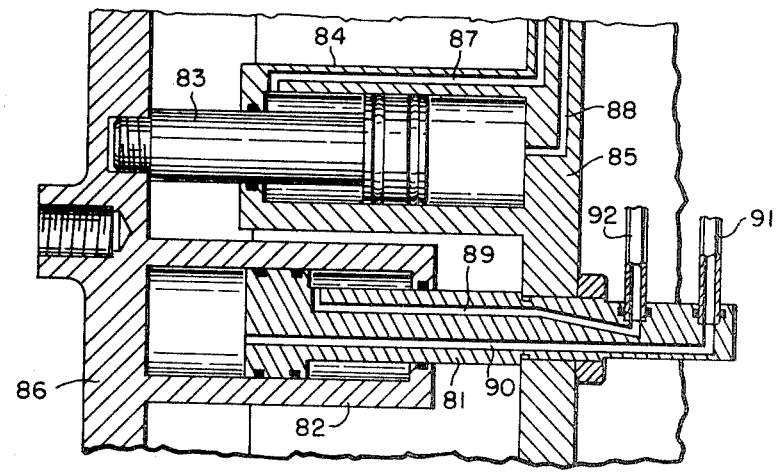
FIG. 3 is a fragmentary longitudinal section through a modified form of redundant control system in accordance with the present invention.

Although the system shown in FIGS. 1 and 2 utilizes four side-by-side piston-cylinders, it will be apparent that such an arrangement is equally applicable for a two-cylinder actuator as well as four or any other number. Where only two piston-cylinders 81, 82 and 83, 84 are provided, as illustrated in FIG. 3, each of the housing parts 85, 86 contains a cylinder for the piston carried by the other housing part. Fluid for actuating the piston 83 carried by the rod end housing part 86 is supplied to opposite ends of the associated cylinder 84 through flow passages 87, 88 in the aft housing part, whereas fluid for actuating the piston 81 carried by the aft housing part 85 is supplied through flow passages 89, 90 in the piston itself, one flow passage of each pair communicating with the head end of the associated cylinder and the other passage communicating with the rod end. The flow passages 89, 90 for the piston carried by the aft housing part 85 may be connected to a suitable fluid source using floating tubes 91, 92 as shown in FIG. 3, and a dual valve spool may be used for controlling flow from independent fluid sources to the piston-cylinders, or separate valves may be used.

The areas of the head ends of the various pistons are shown substantially greater than areas of the rod ends, whereby the output force exerted in the extend direction when fluid is ported to the head ends of the cylinders will be substantially greater than the output force in the retract direction. However, the relative areas of the head and rod ends of the pistons may be varied as desired to suit any output requirements, and equal output forces may be obtained in each direction through the use of a regenerative system wherein system pressure is ported directly to the rod ends of the pistons and head end pressure is modulated to achieve the desired power output.

In summary, the redundant control systems of the present invention incorporate in a two-part housing a compact, lightweight arrangement of two or more piston and cylinder assemblies which are physically isolated from each other, whereby a crack or failure in one housing part or piston resulting in a loss of pressure in one system will not affect the other system. Such control systems are also operated through novel porting to provide for redundant control.

We, therefore, particularly point out and distinctly claim as our invention:

1. A fluid actuator comprising first and second housing parts axially movable relative to each other, a cylinder on each of said housing parts axially offset from each other, a first piston having one end fixed to one of said housing parts and the other end axially slidably received in the cylinder on the other housing part, a second piston having one end fixed to said other housing part and the other end axially slidably received in the cylinder on said one housing part, and fluid passage means for supplying fluid to opposite ends of said cylinders for actuating said pistons and thus said housing parts in opposite directions.

2. The fluid actuator of claim 1 further comprising separate fluid circuits having separate fluid sources for supplying fluid to each of said cylinders, whereby should a failure occur in one of said fluid circuits, said actuator can still be operated by the other fluid circuit.

3. The fluid actuator of claim 2 wherein said fluid passage means for one of said cylinders extends through the associated piston to the head end of said one cylinder.

4. The fluid actuator of claim 2 wherein said fluid passage means for one of said cylinders extends through the associated piston to both ends of said one cylinder.

5. The fluid actuator of claim 2 wherein one of said pistons is hollow, and there is a porting tube in said hollow piston providing communication between the head end of the associated cylinder and its associated fluid passage means.

6. A redundant fluid control system comprising a first housing part, a second housing part axially movable relative to said first housing part, a piston projecting from each of said housing parts into cylinders in the other housing part, and separate fluid circuit means for supplying fluid pressure from separate sources to each of said cylinders, whereby a failure in one of said housing parts, associated pistons, or fluid circuit means resulting in loss of fluid pressure in one system will not affect the operation of the other system.

7. A fluid control system comprising a first housing part, a second housing part axially movable relative to said first housing part, a plurality of cylinders on each of said housing parts facing each other in axially offset relation, a plurality of pistons fixed to each of said housing parts and axially slidably received in the cylinders on the other housing parts, and fluid passage means for supplying fluid to opposite ends of said cylinders for actuating said pistons and thus said housing parts in opposite directions.

8. The control system of claim 7 wherein the fluid passage means connected to the cylinders on one of said housing parts includes a fluid circuit separate from the fluid passage means connected to the cylinders on the other housing part to provide for redundant control of said system, said fluid circuits having separate fluid sources.

9. The control system of claim 7 wherein there are two cylinders on one housing part disposed side by side and having a common wall portion tserebetween, with porting holes in opposite ends of said common wall portion for providing fluid communication between the head ends of said cylinders and the rod ends of said cylinders.

10. The control system of claim 9 wherein said fluid passage means for said side-by-side cylinders extend through one of the associated pistons to the head end of the associated cylinder and through the porting hole communicating both head ends with each other, and through the other associated piston to the associated rod end and through the porting hole communicating both rod ends with each other.

11. The control system of claim 10 wherein the associated pistons for said side-by-side cylinders are hollow and said passage means includes porting tubes extending between opposite ends of said hollow pistons.

12. The control system of claim 11 wherein the head end of one of said associated pistons has a passage therein communicating the associated porting tube with the head end of said one cylinder.

13. The control system of claim 12 wherein the head end of the other of said associated pistons has radial passages communicating the associated porting tube with the rod end of said other cylinder.

14. The control system of claim 10 wherein the fluid passage means for said side-by-side cylinders include floating tubes connecting the rod ends of the associated pistons with a first pair of fluid ports of a valve manifold.

15. The control system of claim 14 wherein said valve manifold includes a second pair of fluid ports communicating with said fluid passage means for the cylinders associated with the other housing part, and a single valve spool for selectively supplying fluid pressure from separate sources to one of the fluid ports of each pair and venting the other port of each pair, and vice versa.

16. The control system of claim 7 wherein the rod ends of said pistons have studs thereon which project through openings in the associated housing parts, and jam nuts are threaded on the ends of said studs for securing said pistons to said housing parts.